US012601881B2

(12) United States Patent
Wu et al.

(10) Patent No.: US 12,601,881 B2
(45) Date of Patent: Apr. 14, 2026

(54) OPTICAL FIBER CONNECTOR WITH IMPROVED FIXING PLATE

(71) Applicant: DONGGUAN LUXSHARE TECHNOLOGIES CO., LTD, Dongguan City (CN)

(72) Inventors: Xiaoping Wu, Dongguan City (CN); Rongzhe Guo, Dongguan City (CN); Xiaogang Liu, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 595 days.

(21) Appl. No.: 18/114,606

(22) Filed: Feb. 27, 2023

(65) Prior Publication Data

US 2024/0255711 A1     Aug. 1, 2024

(30) Foreign Application Priority Data

Jan. 31, 2023    (CN) .......................... 202310073258.3

(51) Int. Cl.
*G02B 6/38* (2006.01)

(52) U.S. Cl.
CPC ......... *G02B 6/3893* (2013.01); *G02B 6/3825* (2013.01); *G02B 6/3897* (2013.01)

(58) Field of Classification Search
CPC ...................................................... G02B 6/38
USPC ........................................................... 385/78
See application file for complete search history.

(56) References Cited

U.S. PATENT DOCUMENTS

| | | | | |
|---|---|---|---|---|
| 6,445,867 B1* | 9/2002 | Gilliland | .............. | G02B 6/3825 |
| | | | | 385/134 |
| 6,529,103 B1* | 3/2003 | Brendel | ................... | H01G 4/35 |
| | | | | 333/182 |
| 10,564,370 B2 | 2/2020 | Hirano et al. | | |
| 2002/0025125 A1* | 2/2002 | Williams | ............. | G02B 6/3897 |
| | | | | 385/139 |
| 2002/0172470 A1* | 11/2002 | Johnson | ............... | G02B 6/3874 |
| | | | | 385/70 |

(Continued)

FOREIGN PATENT DOCUMENTS

| | | |
|---|---|---|
| CN | 105988164 B | 2/2019 |
| CN | 211826618 U | 10/2020 |

(Continued)

*Primary Examiner* — Kaveh C Kianni
(74) *Attorney, Agent, or Firm* — Birch, Stewart, Kolasch & Birch, LLP

(57) ABSTRACT

An optical fiber connector includes an insulating body, a number of optical fibers and a fixing plate. The insulating body includes a first end surface. The number of optical fibers are mounted to the insulating body. Each optical fiber includes a first extension portion protruding beyond the first end surface. The fixing plate is fixed to the insulating body. The fixing plate includes a mating surface, a mounting surface and a number of through holes extending through the mounting surface and the mating surface. The first extension portion is inserted into a corresponding through hole from the mounting surface. The first extension portion is exposed on the mating surface. The fixing plate of the present disclosure is configured to be made of a material whose precision is easier to guarantee, thereby improving the precision of the optical fiber connector.

20 Claims, 10 Drawing Sheets

(56) References Cited

U.S. PATENT DOCUMENTS

| | | | | |
|---|---|---|---|---|
| 2003/0198442 A1 * | 10/2003 | Cheng | ............... | G02B 6/3885 |
| | | | | 385/59 |
| 2005/0201666 A1 * | 9/2005 | Terada | ............... | G02B 6/4202 |
| | | | | 385/88 |
| 2007/0292083 A1 * | 12/2007 | Nielson | ............... | G02B 6/3885 |
| | | | | 385/78 |
| 2009/0252459 A1 * | 10/2009 | Nielson | ............... | G02B 6/32 |
| | | | | 385/79 |
| 2013/0121648 A1 * | 5/2013 | Hung | ............... | G02B 6/4293 |
| | | | | 385/79 |
| 2013/0177280 A1 * | 7/2013 | Nielson | ............... | G02B 6/262 |
| | | | | 385/79 |
| 2018/0031783 A1 * | 2/2018 | Lewallen | ............... | G02B 6/387 |
| 2018/0372970 A1 | 12/2018 | Hirano et al. | | |
| 2019/0384019 A1 * | 12/2019 | Fiebig | ............... | G02B 6/42 |
| 2019/0384024 A1 * | 12/2019 | Neukirch | ............... | G02B 6/423 |
| 2024/0176083 A1 * | 5/2024 | Takezaki | ............... | G02B 6/403 |

FOREIGN PATENT DOCUMENTS

| | | | | |
|---|---|---|---|---|
| CN | 219328920 | U | | 7/2023 |
| JP | 2000-221368 | A | | 8/2000 |
| JP | 3234689 | B2 | * | 12/2001 |
| JP | 2006-30287 | A | | 2/2006 |
| TW | 201704795 | A | | 2/2017 |
| WO | WO 2022/270510 | A1 | | 12/2022 |

* cited by examiner

OPTICAL FIBER CONNECTOR WITH IMPROVED FIXING PLATE

CROSS-REFERENCE TO RELATED APPLICATION

This patent application claims priority of a Chinese Patent Application No. 202310073258.3, filed on Jan. 31, 2023 and titled "OPTICAL FIBER CONNECTOR", the entire content of which is incorporated herein by reference.

TECHNICAL FIELD

The present disclosure relates to an optical fiber connector, which belongs to a technical field of connectors.

BACKGROUND

A fiber optic connector in the related art generally includes an insulating body and a plurality of optical fibers assembled to the insulating body. The insulating body includes a mating surface and a plurality of through holes extending through the mating surface. The optical fibers are inserted into corresponding through holes and exposed on the mating surface, so as to mate with a mating connector.

With the continuous development of optical fiber connectors, the optical fiber becomes thinner, and the through holes for receiving the optical fibers become denser. On the one hand, this poses an increasing challenge to the machining accuracy in manufacturing the through holes; and on the other hand, it also poses a challenge on how to mount the optical fibers into these through holes.

Therefore, the design in the related art using the insulating body as the mating surface has become more and more difficult to meet the needs.

SUMMARY

An object of the present disclosure is to provide a fiber optic connector with higher precision.

In order to achieve the above object, the present disclosure adopts the following technical solution: an optical fiber connector, including: an insulating body including a first end portion, the first end portion including a first end surface; a plurality of optical fibers mounted to the insulating body, each optical fiber including a first extension portion protruding beyond the first end surface; and a fixing plate fixed to the first end portion of the insulating body, the fixing plate and the insulating body being made of different materials, the fixing plate including a mating surface, a mounting surface opposite to the mating surface, and a plurality of through holes extending through the mounting surface and the mating surface; the first extension portion being inserted into a corresponding through hole from the mounting surface; the first extension portion being exposed on the mating surface.

In order to achieve the above object, the present disclosure adopts the following technical solution: an optical fiber connector, including: an insulating body including a first end surface and a plurality of receiving holes extending through the first end surface; a plurality of optical fibers assembled to the insulating body, each optical fiber including a first extension portion protruding beyond the first end surface; and a ceramic fixing plate fixed to the insulating body, the fixing plate and the insulating body being made of different materials, the fixing plate including a mating surface, a mounting surface opposite to the mating surface, and a plurality of through holes extending through the mounting surface and the mating surface; the plurality of through holes and the plurality of receiving holes being aligned with each other; the first extension portion being inserted into a corresponding receiving hole and a corresponding through hole; the first extension portion being exposed on the mating surface.

In order to achieve the above object, the present disclosure adopts the following technical solution: an optical fiber connector, including: an insulating body including a first end surface, a second end surface opposite to the first end surface, a plurality of receiving holes extending through the first end surface, and a receiving chamber extending through the second end surface; a plurality of optical fibers assembled to the insulating body, each optical fiber including a first extension portion protruding beyond the first end surface; a ceramic fixing plate fixed to the insulating body, the fixing plate and the insulating body being made of different materials, the fixing plate including a mating surface, a mounting surface opposite to the mating surface, and a plurality of through holes extending through the mounting surface and the mating surface; the plurality of through holes and the plurality of receiving holes being aligned with each other; the first extension portion being inserted into a corresponding receiving hole and a corresponding through hole; the first extension portion being exposed on the mating surface; a fixing shell defining a receiving space; an installation block including a first fixing portion inserted in the receiving chamber of the insulating body, a second fixing portion received in the receiving space, and a slot through which the plurality of optical fibers pass; and a pair of guiding and positioning pins passing through the insulating body and the fixing plate, and protruding beyond the mating surface; the pair of guiding and positioning pins are in lock with the fixing shell so as to fix the fixing shell to the insulating body.

Compared with the prior art, the fixing plate and the insulating body in the present disclosure are made of different materials. With such arrangement, the fixing plate can be made of a material whose precision is easier to guarantee, thereby improving the precision of the optical fiber connector.

DETAILED DESCRIPTION

Figure 1:
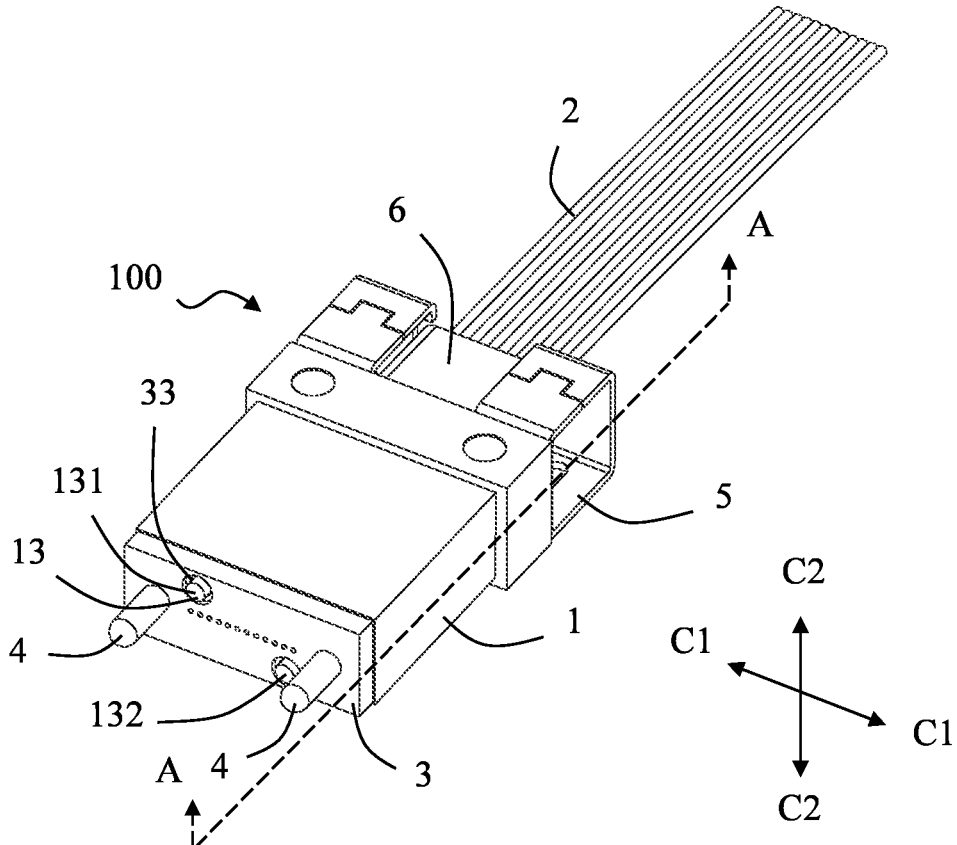
FIG. 1 is a schematic perspective view of an optical fiber connector in accordance with a first embodiment of the present disclosure.
Figure 2:
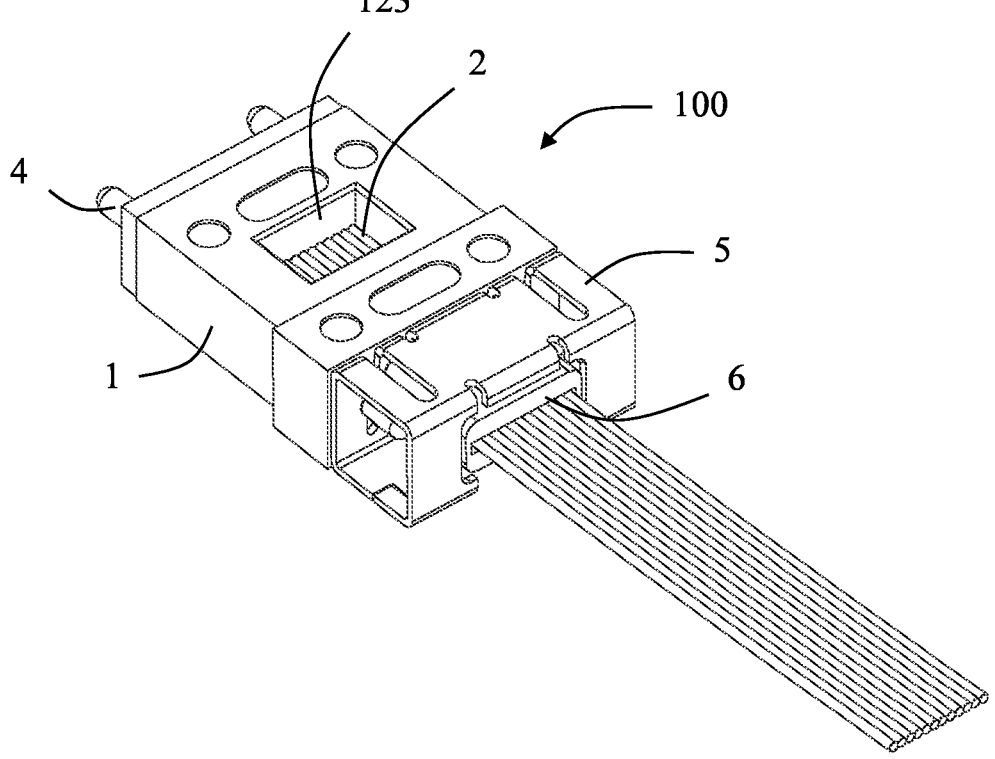
FIG. 2 is a schematic perspective view of FIG. 1 from another angle.
Figure 3:
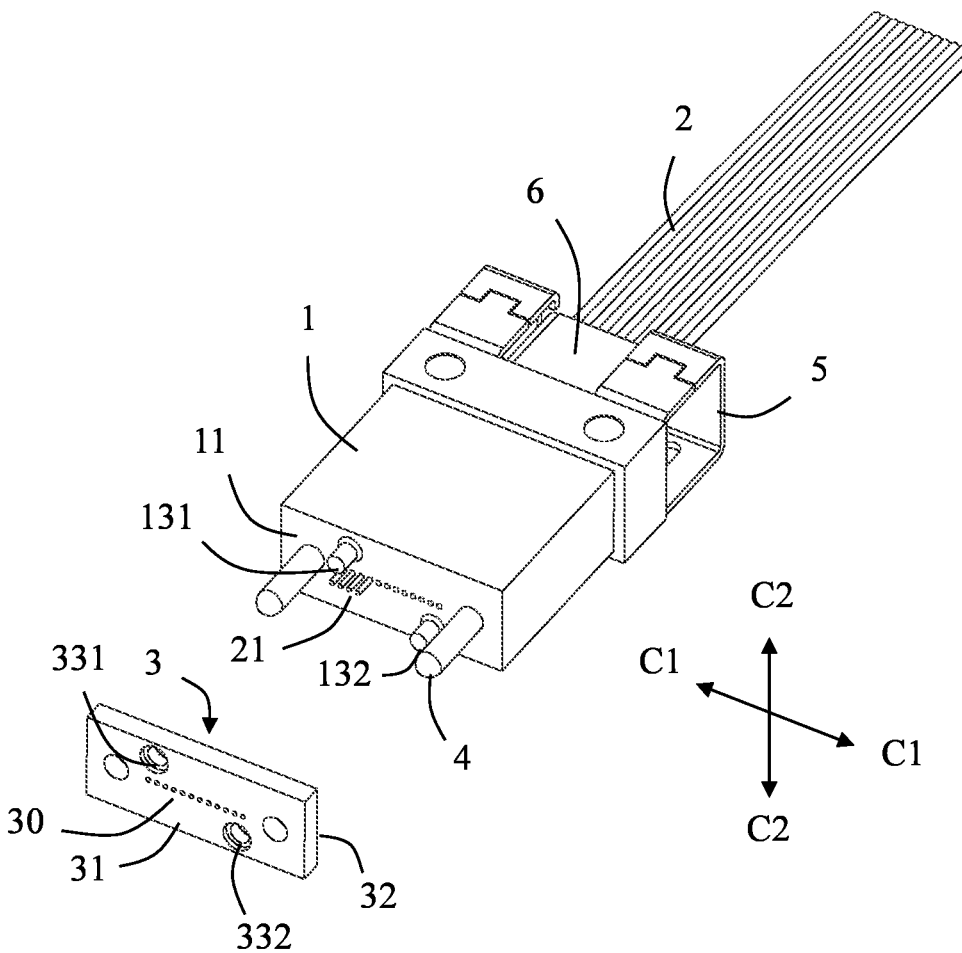
FIG. 3 is a partial perspective exploded view of FIG. 1.
Figure 4:
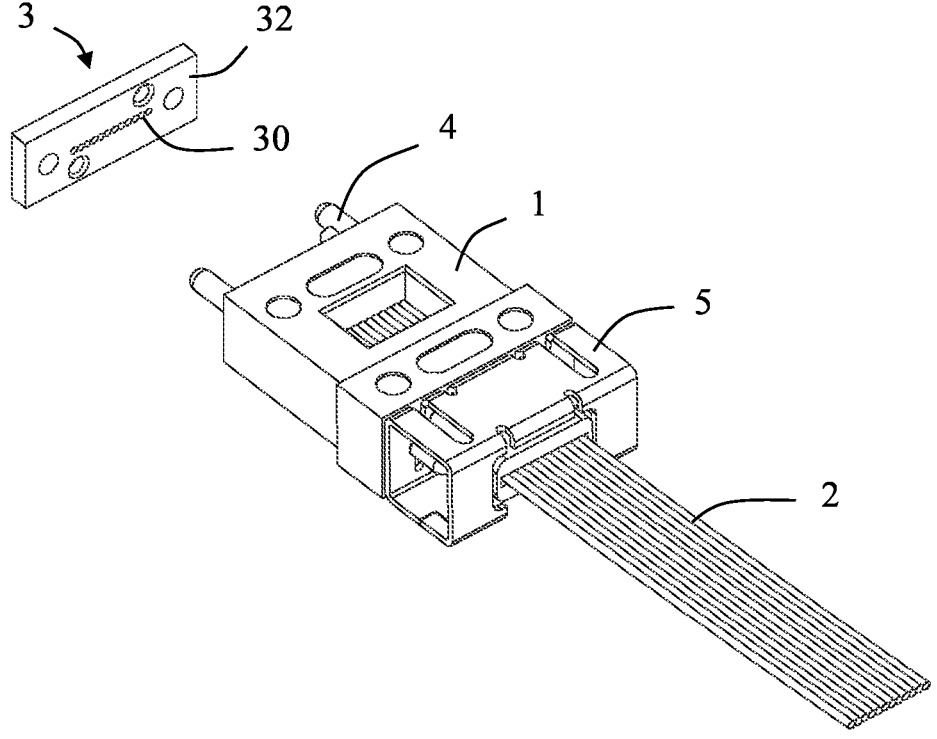
FIG. 4 is a partial perspective exploded view of FIG. 3 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 9, a first embodiment of the present disclosure discloses an optical fiber connector 100, which includes an insulating body 1, a plurality of optical fibers 2, a fixing plate 3, a pair of guiding and positioning pins 4, a fixing shell 5 and an installation block 6.

Figure 5:
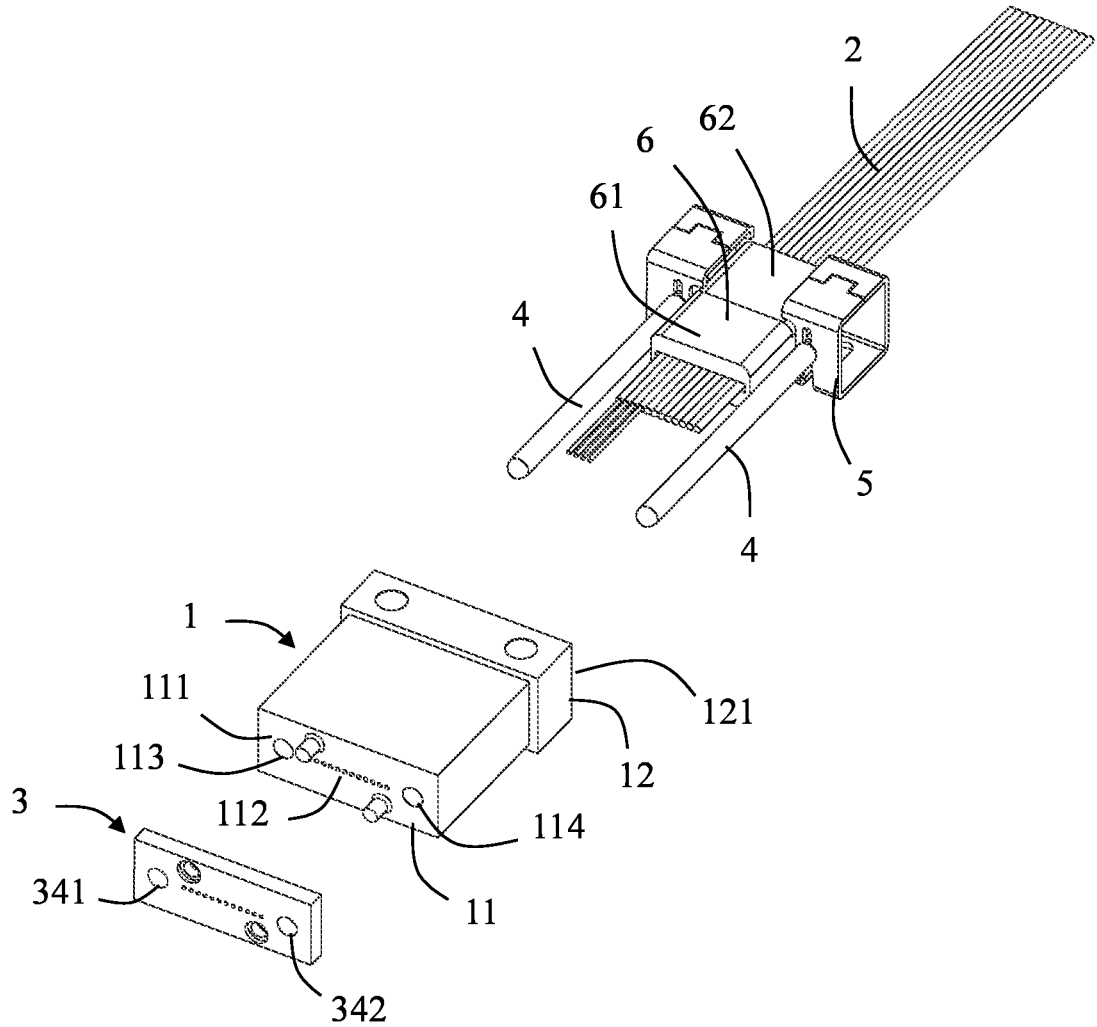
FIG. 5 is a further partial perspective exploded view of FIG. 3.
Figure 6:
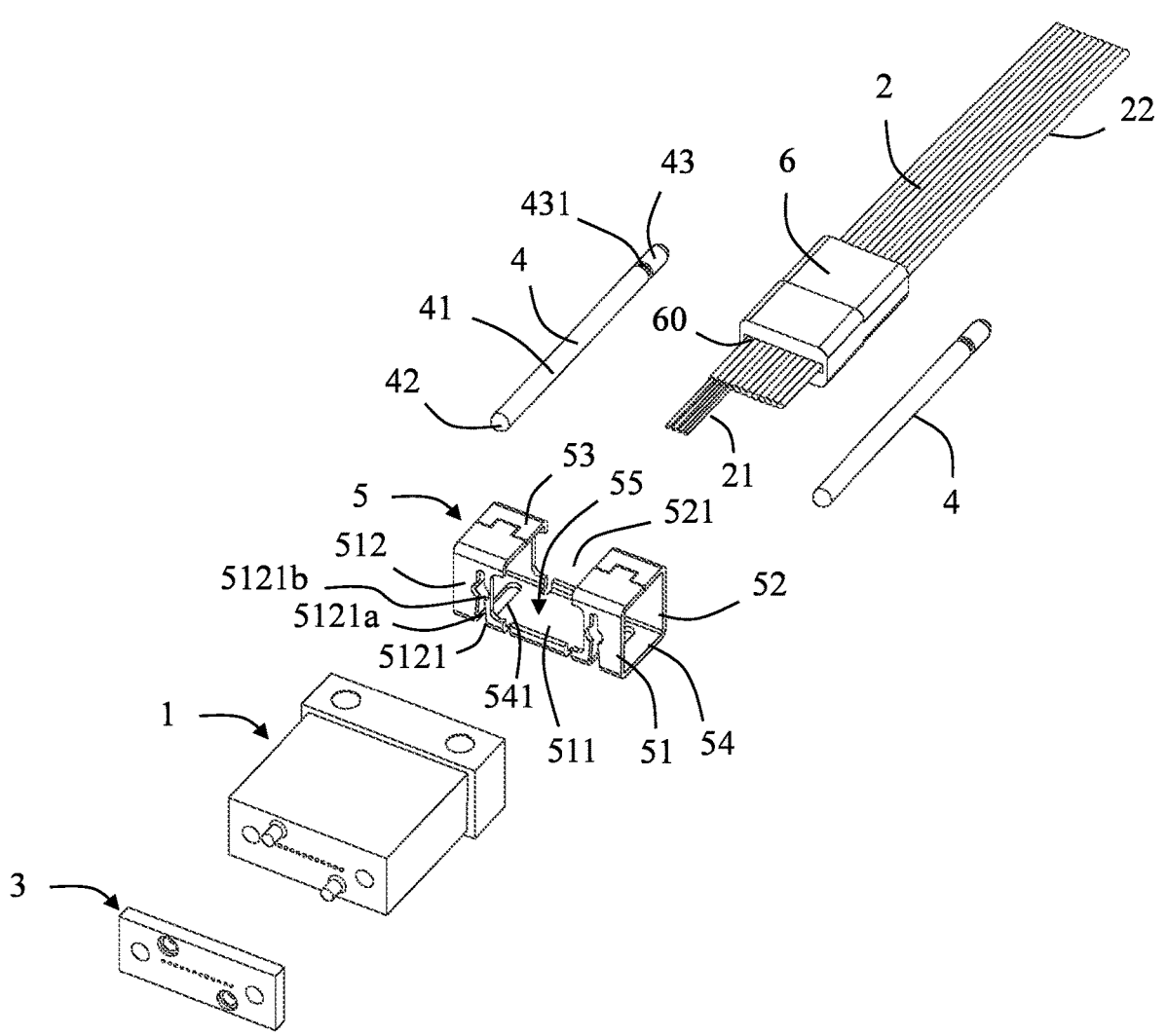
FIG. 6 is a further partial perspective exploded view of FIG. 5.
Figure 7:
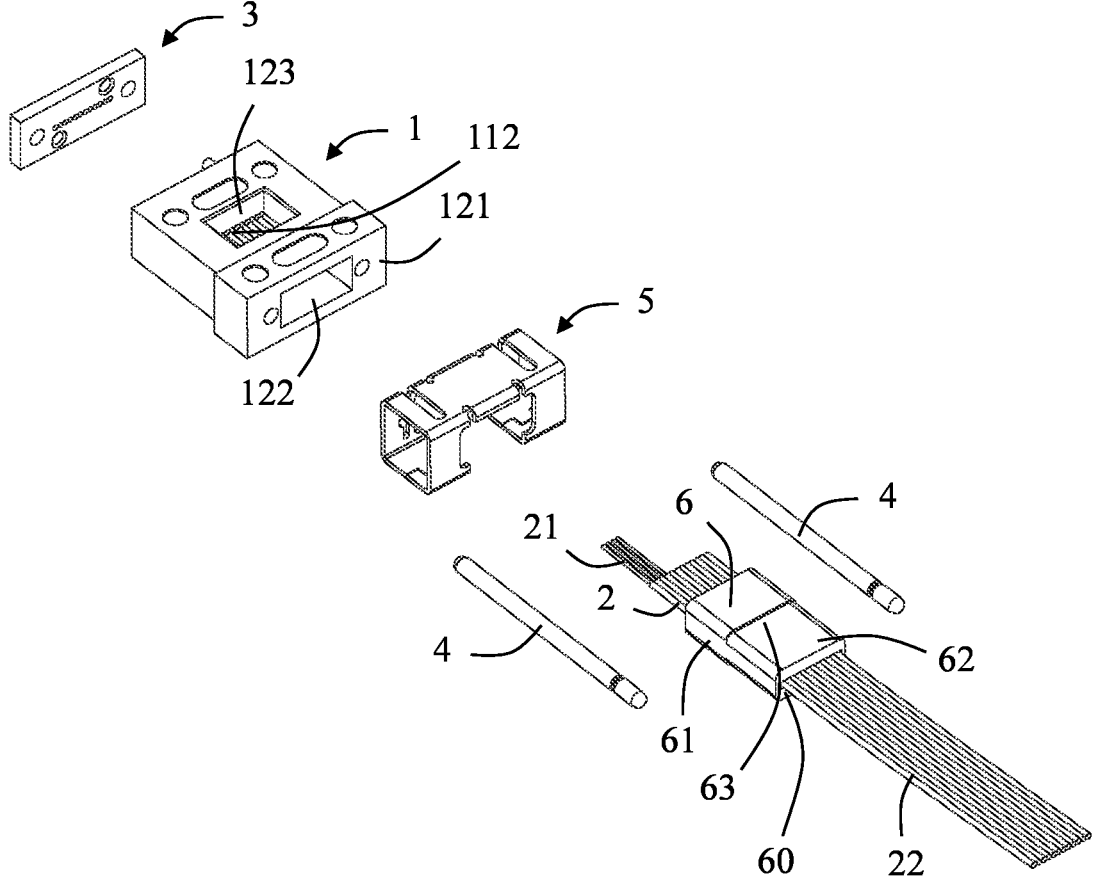
FIG. 7 is a partial perspective exploded view of FIG. 6 from another angle.
Figure 8:
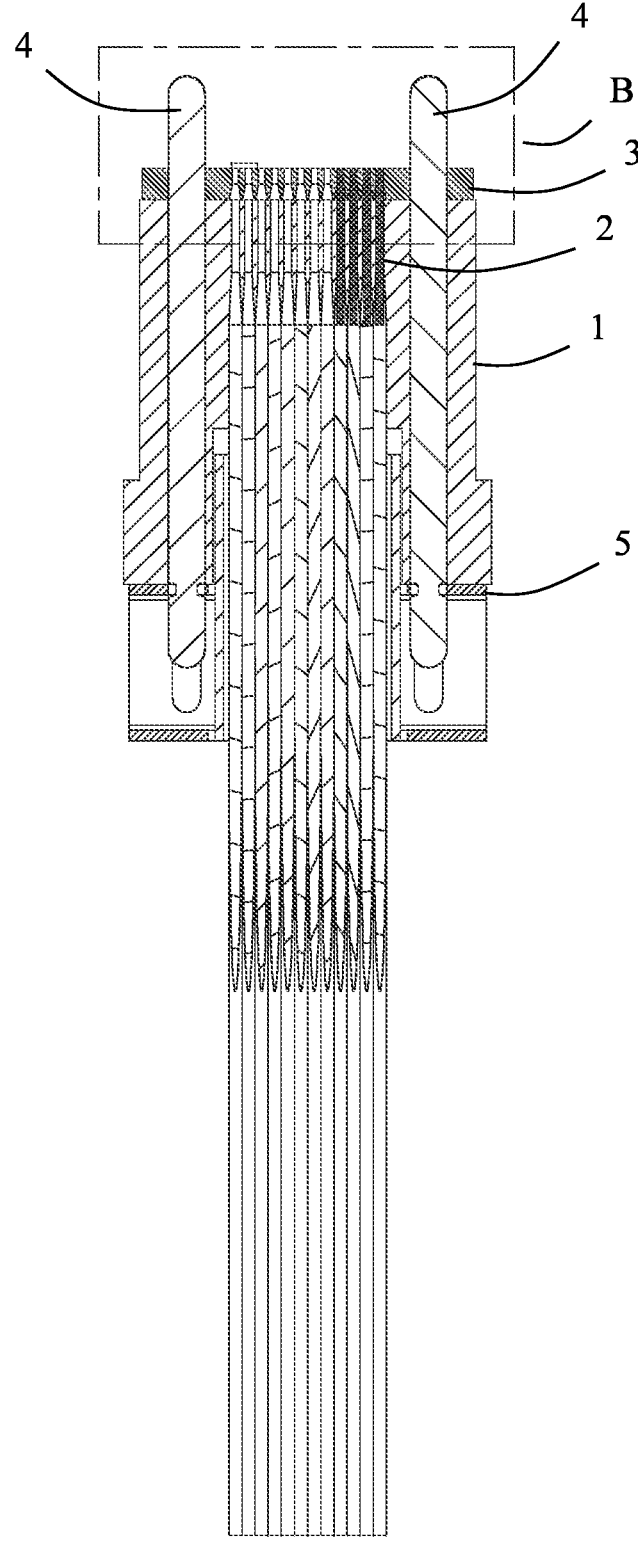
FIG. 8 is a schematic sectional view taken along line A-A in FIG. 1.

Referring to FIG. 5 to FIG. 7, in the embodiment shown in the present disclosure, the insulating body 1 includes a first end portion 11 and a second end portion 12 opposite to the first end portion 11. The first end portion 11 includes a first end surface 111 and a plurality of receiving holes 112 extending through the first end surface 111. The second end portion 12 includes a second end surface 121 and a receiving chamber 122 extending through the second end surface 121. In the illustrated embodiment of the present disclosure, the insulating body 1 further includes a middle opening 123 between the first end surface 111 and the second end surface 121. The middle opening 123 extends through the insulating body 1 along a vertical direction, so as to facilitate observing the installation state of the optical fibers 2. The middle opening 123 communicates with the plurality of receiving holes 112 and the receiving chamber 122. In the illustrated embodiment of the present disclosure, the plurality of receiving holes 112 are spaced apart and arranged side by side, and any two adjacent receiving holes 112 are separated by a partition wall of the insulating body 1 so as not to interfere with each other. Referring to FIG. 5, in the embodiment shown in the present disclosure, the insulating body 1 further includes a first positioning hole 113 and a second positioning hole 114 extending through the first end surface 111 and the second end surface 121. The first positioning hole 113 and the second positioning hole 114 are located on two sides of the receiving holes 112, respectively.

The plurality of optical fibers 2 are mounted to the insulating body 1. In the illustrated embodiment of the present disclosure, the plurality of optical fibers 2 are assembled to the insulating body 1. The optical fibers 2 are inserted into corresponding receiving holes 112. Each optical fiber 2 includes a first extension portion 21 protruding beyond the first end surface 111. Those skilled in the art can understand that in the illustrated embodiment of the present disclosure, the first extension portion 21 is a core of the optical fiber 2. In the illustrated embodiment of the present disclosure, part of the optical fiber 2 and part of the first extension portion 21 of the optical fiber 2 are not shown in the drawings.

Referring to FIG. 7, in the illustrated embodiment of the present disclosure, in order to facilitate the installation of the plurality of optical fibers 2, the installation block 6 is provided with a slot 60 through which the plurality of optical fibers 2 pass. The installation block 6 is an insulating block. In the illustrated embodiment of the present disclosure, the slot 60 is a flat slot, and all the optical fibers 2 pass through the slot 60. In the embodiment shown in the present disclosure, the installation block 6 includes a first fixing portion 61 inserted in the receiving chamber 122 and a second fixing portion 62 installed and fixed in the fixing shell 5. In the illustrated embodiment of the present disclosure, a height of the first fixing portion 61 is greater than that of the second fixing portion 62 so as to form an installation step portion 63.

Referring to FIG. 6, in the illustrated embodiment of the present disclosure, the fixing shell 5 is made of a metal sheet. The fixing shell 5 includes a first mounting wall 51, a second mounting wall 52 opposite to the first mounting wall 51, a top wall 53, a bottom wall 54 opposite to the top wall 53, and a receiving space 55 for receiving the second fixing portion 62. In the illustrated embodiment of the present disclosure, the first mounting wall 51 defines a first opening 511 communicating with the receiving space 55. The second mounting wall 52 defines a second opening 521 communicating with the receiving space 55.

In the illustrated embodiment of the present disclosure, the structure of the fixing shell 5 located on two sides of the receiving space 55 is substantially of a frame configuration. That is, the first mounting wall 51, the bottom wall 54, the second mounting wall 52 and the top wall 53 are sequentially connected. In this way, the fixing shell 5 has a relatively high structural strength.

The first mounting wall 51 further includes locking walls 512 located on two sides of the first opening 511. Each locking wall 512 defines a locking groove 5121. The locking groove 5121 includes a first locking groove 5121a extending downwardly through the locking wall 512, and a second locking groove 5121b located above the first locking groove 5121a and communicating with the first locking groove 5121a. The second locking groove 5121b is a circular hole, and its size is larger than that of the first locking groove 5121a. The bottom wall 54 defines a relief slot 541 communicating with the first locking slot 5121a. The relief slot 541 extends downwardly through the bottom wall 54.

Referring to FIG. 1 to FIG. 4, FIG. 8 and FIG. 9, the fixing plate 3 is fixed on the first end portion 11 of the insulating body 1. The fixing plate 3 and the insulating body 1 are made of different materials. The fixed plate 3 includes a mating surface 31, a mounting surface 32 opposite to the mating surface 31, and a plurality of through holes 30 extending through the mounting surface 32 and the mating surface 31. The first extension portions 21 of the optical fibers 2 are inserted into corresponding through holes 30 from the mounting surface 32. The first extension portions 21 are exposed on the mating surface 31. In the illustrated embodiment of the present disclosure, the end surface of each first extension portion 21 is flush with the mating surface 31. Each optical fiber 2 further includes a second extension portion 22 extending beyond the fixing shell 5.

In one embodiment of the present disclosure, the fixing plate 3 is a ceramic fixing plate, which is beneficial to improve its precision through machining, such as a flatness of the mating surface 31 and a dimensional accuracy of each through hole 30. The fixing plate 3 is arranged opposite to the fixing shell 5. The fixing plate 3 and the fixing shell are located at two ends of the insulating body 1, respectively. In the illustrated embodiment of the present disclosure, the fixing plate 3 mates with the insulating body 1 to realize the fixing of the two. Due to the relatively high cost of the ceramic fixing plate, in the technical solution shown in the present disclosure, the ceramic fixing plate is provided only at a portion that is used to mate with a mating connector, while other portions still use the insulating body 1. This design is beneficial to save costs while ensuring accuracy.

The fixing plate 3 defines at least one hole 33 extending through the mounting surface 32 and the mating surface 31. The optical fiber connector 100 includes at least one thermal riveting post 13 inserted in the at least one hole 33 so as to fix the fixing plate 3 to the first end portion 11 of the insulating body 1. In addition, as shown in FIG. 5, the fixing plate 3 further defines a first mounting hole 341 and a second mounting hole 342 which extend through the mounting surface 32 and the mating surface 31. The first mounting hole 341 and the second mounting hole 342 are located on two sides of the plurality of through holes 30. The first mounting hole 341 is aligned with the first positioning hole 113, and the second mounting hole 342 is aligned with the second positioning hole 114, in order to install the guiding and positioning pins 4. Those skilled in the art can understand that, on the one hand, the guiding and positioning pins 4 protruding from the fixing plate 3 can play a role of guiding and positioning when mating with the mating connector. On the other hand, when the guiding and positioning pins 4 pass through the first positioning hole 113 and the first mounting hole 341, and pass through the second positioning hole 114 and the second mounting hole 342, the fixing plate 3 can be better positioned on the insulating body 1, which reduces the risk of movement of the fixing plate 3 during subsequent fixing of the fixing plate 3.

In the illustrated embodiment of the present disclosure, the plurality of through holes 30 are arranged in a row along a first direction C1-C1. The at least one hole 33 includes a first hole 331 and a second hole 332. The first hole 331 and the second hole 332 are located on two sides of the plurality of through holes 30 along a second direction C2-C2. The second direction C2-C2 is perpendicular to the first direction C1-C1. In the illustrated embodiment of the present disclosure, the at least one thermal riveting post 13 includes a first thermal riveting post 131 received in the first hole 331, and a second thermal riveting post 132 received in the second hole 332. The first thermal riveting post 131 and the second thermal riveting post 132 fix the fixing plate 3 and the insulating body 1 together after thermal melting. In the illustrated embodiment of the present disclosure, the first thermal riveting post 131 and the second thermal riveting post 132 are integrally formed with the insulating body 1. Of course, in other embodiments, the first thermal riveting post 131 and the second thermal riveting post 132 may also be components manufactured separately from the insulating body 1.

In the illustrated embodiment of the present disclosure, the first hole 331 and the second hole 332 are arranged in a staggered manner along the second direction C2-C2.

Figure 9:
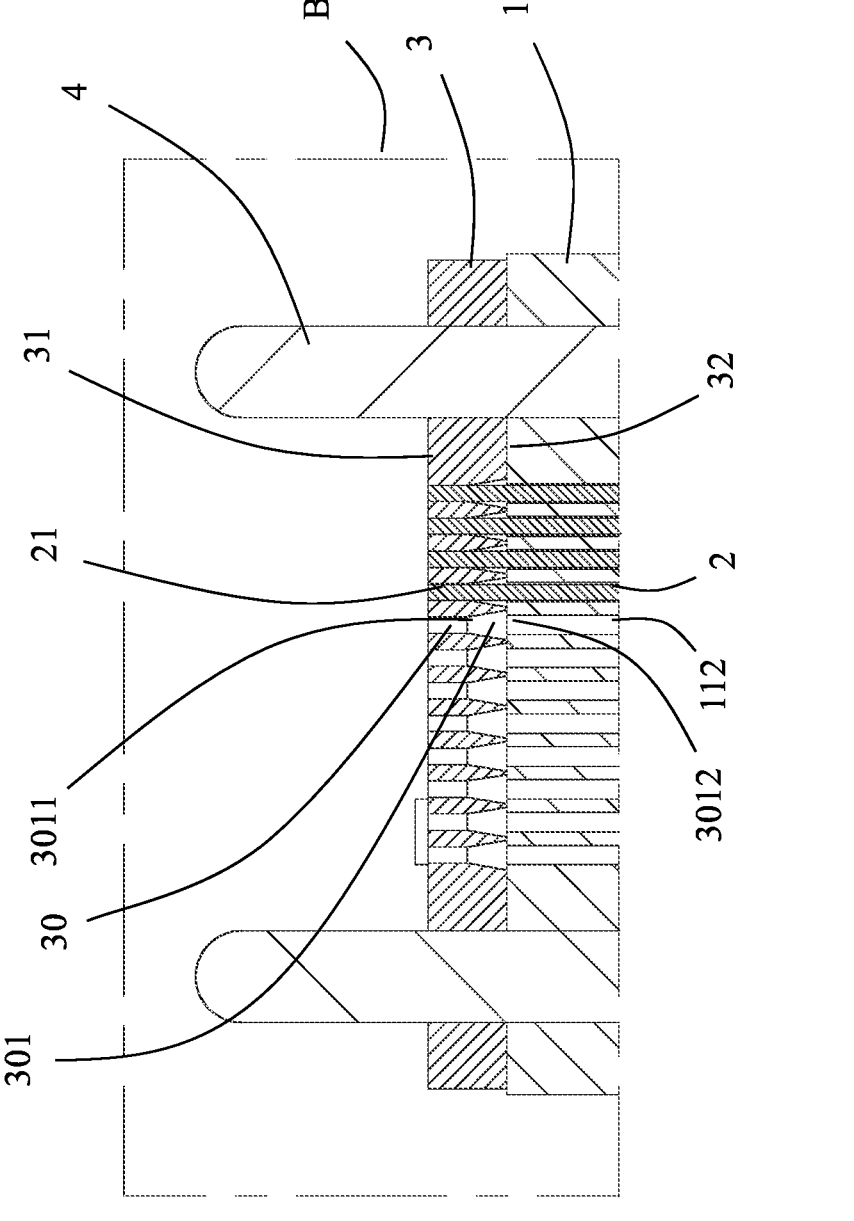
FIG. 9 is a partially enlarged view of a frame part B in FIG. 8.

As shown in FIG. 9, each through hole 30 includes a trumpet hole 301. The trumpet hole 301 includes a first orifice 3011 and a second orifice 3012 opposite to the first orifice 3011. The second orifice 3012 extends through the mounting surface 32. A size of the second orifice 3012 is larger than a size of the first orifice 3011. The present disclosure facilitates guiding and installing the first extension portion 21 of the optical fiber 2 in the corresponding through hole 30 by providing the trumpet hole 301.

Those skilled in the art can understand that the present disclosure can more easily ensure the accuracy of the fixing plate 3 itself by providing the fixing plate 3 manufactured separately from the insulating body 1. Due to the manufacturing process, even if the dimensional accuracy of the receiving hole 112 of the insulating body 1 cannot be strictly guaranteed, through the guidance of the trumpet hole 301, the first extension portion 21 of the optical fiber 2 can also be precisely controlled when it finally enters the through hole 30.

Figure 10:
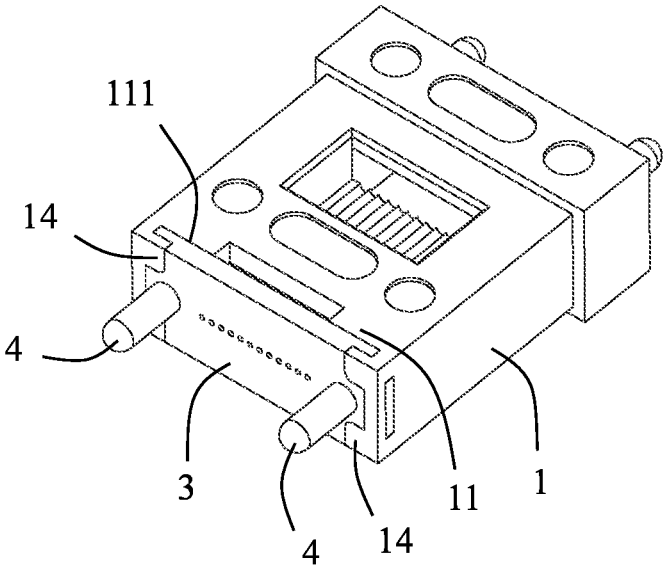
FIG. 10 is a schematic perspective view of the optical fiber connector in accordance with a second embodiment of the present disclosure, wherein optical fibers, a fixing shell and an installation block are not shown.

As shown in FIG. 10, in a second embodiment of the optical fiber connector 100 of the present disclosure, the insulating body 1 is injection-molded on two sides of the fixing plate 3 in order to fix the fixing plate 3 to the first end portion 11 of the insulating body 1. The insulating body 1 includes molding blocks 14 covering two sides and a front end of the fixing plate 3.

As shown in FIG. 6, the guiding and positioning pins 4 pass through the insulating body 1 and the fixing plate 3, and protrude beyond the mating surface 31. Each guiding and positioning pin 4 includes a main body portion 41 inserted in the insulating body 1 and the fixing plate 3, a guiding and positioning portion 42 extending from one end of the main body portion 41 and protruding beyond the fixing plate 3, and an installation portion 43 extending from another end of the main body portion 41. The installation portion 43 defines a locking slit 431. The locking slit 431 is locked with the locking groove 5121 of the locking wall 512 along the vertical direction, so as to realize the connection between the guiding and positioning pins 4 and the fixing shell 5. In the illustrated embodiment of the present disclosure, there are two guiding and positioning pins 4 located on two sides of the through holes 30 along the first direction C1-C1.

One of the assembly methods of the present disclosure is as follows: firstly, the installation block 6 is installed to the fixing shell 5; the second fixing portion 62 is inserted into the first opening 511 from front to back; and the installation step portion 63 abuts against the first mounting wall 51 to realize position limitation. Then, the optical fibers 2 are passed through the slot 60. After that, the guiding and positioning pins 4 are installed and fixed in the locking grooves 5121 of the fixing shell 5. In the illustrated embodiment of the present disclosure, the guiding and positioning pins 4 are installed in the locking groove 5121 of the fixing shell 5 from bottom to top. Each guiding and positioning pin 4 passes through a corresponding relief slot 541 upwardly. The guiding and positioning pin 4 slides upwardly along the first locking groove 5121_a_, and is finally locked in the second locking groove 5121_b_. At this time, the guiding and positioning pins 4 are fixed to the fixing shell 5 along the second direction C2-C2. The aforementioned components are assembled to the insulating body 1 as a whole, the first fixing portion 61 is inserted into the receiving chamber 122, and the guiding and positioning pins 4 are passed through the insulating body 1 and the fixing plate 3. Finally, the fixing plate 3 is fixed to the first end portion 11 of the insulating body 1.

Of course, in other embodiments, the fixing plate 3 can also be fixed to the first end portion 11 of the insulating body 1 first, and then the guiding and positioning pins 4 can be installed.

Compared with the prior art, the fixing plate 3 and the insulating body 1 in the present disclosure are made of different materials. With such arrangement, the fixing plate 3 can be made of materials whose precision is easier to guarantee, thereby improving the precision of the optical fiber connector 100.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An optical fiber connector, comprising:
an insulating body including a first end portion, the first end portion including a first end surface;
a plurality of optical fibers mounted to the insulating body, each optical fiber including a first extension portion protruding beyond the first end surface; and
a fixing plate fixed to the first end portion of the insulating body, the fixing plate and the insulating body being made of different materials, the fixing plate including a mating surface, a mounting surface opposite to the mating surface, and a plurality of through holes extending through the mounting surface and the mating surface; the first extension portion being inserted into a corresponding through hole from the mounting surface; the first extension portion being exposed on the mating surface;
wherein each through hole comprises a trumpet hole, the trumpet hole includes a first orifice and a second orifice opposite to the first orifice; and wherein the second orifice extends through the mounting surface, and a size of the second orifice is larger than a size of the first orifice.

2. The optical fiber connector according to claim 1, wherein the fixing plate is a ceramic fixing plate.

3. The optical fiber connector according to claim 1, wherein the fixing plate defines at least one hole extending through the mounting surface and the mating surface; and
wherein the optical fiber connector includes at least one thermal riveting post inserted in the at least one hole so as to fix the fixing plate to the first end portion of the insulating body.

4. The optical fiber connector according to claim 3, wherein the plurality of through holes are arranged in a row along a first direction;
wherein the at least one hole includes a first hole and a second hole; the first hole and the second hole are located on two sides of the plurality of through holes along a second direction; the second direction is perpendicular to the first direction; and
wherein the at least one thermal riveting post includes a first thermal riveting post received in the first hole and a thermal riveting post received in the second hole.

5. The optical fiber connector according to claim 4, wherein the first hole and the second hole are disposed in a staggered manner along the second direction.

6. The optical fiber connector according to claim 1, wherein the insulating body is injection-molded on two sides of the fixing plate, so as to fix the fixing plate to the first end portion of the insulating body.

7. The optical fiber connector according to claim 1, further comprising a guiding and positioning pin; wherein the guiding and positioning pin passes through the insulating body and the fixing plate, and protrudes beyond the mating surface.

8. The optical fiber connector according to claim 7, wherein the guiding and positioning pin comprises a main body portion inserted in the insulating body and the fixing plate, a guiding and positioning portion extending from one end of the main body portion and protruding beyond the fixing plate, and an installation portion extending from another end of the main body portion; the installation portion defines a locking slit; and
wherein the optical fiber connector further includes a fixing shell arranged opposite to the fixing plate; the fixing shell includes a locking wall locked in the locking slit.

9. The optical fiber connector according to claim 8, wherein the fixing shell defines a receiving space, the optical fiber connector further includes an installation block received in the receiving space and fixed to the fixing shell, the installation block defines a slot through which the plurality of optical fibers pass.

10. An optical fiber connector, comprising:
an insulating body including a first end surface and a plurality of receiving holes extending through the first end surface;
a plurality of optical fibers assembled to the insulating body, each optical fiber including a first extension portion protruding beyond the first end surface; and
a ceramic fixing plate fixed to the insulating body, the fixing plate and the insulating body being made of different materials, the fixing plate including a mating surface, a mounting surface opposite to the mating surface, and a plurality of through holes extending through the mounting surface and the mating surface; the plurality of through holes and the plurality of receiving holes being aligned with each other; the first extension portion being inserted into a corresponding receiving hole and a corresponding through hole; the first extension portion being exposed on the mating surface;
wherein the optical fiber connector further comprises a guiding and positioning pin; the guiding and positioning pin passes through the insulating body and the fixing plate;
wherein the guiding and positioning pin comprises a main body portion inserted in the insulating body and the fixing plate, a guiding and positioning portion extending from one end of the main body portion and protruding beyond the fixing plate, and an installation portion extending from another end of the main body portion; the installation portion defines a locking slit; and wherein the optical fiber connector further includes a fixing shell arranged opposite to the fixing plate; the fixing shell includes a locking wall locked in the locking slit.

11. The optical fiber connector according to claim 10, wherein the fixing plate defines at least one hole extending through the mounting surface and the mating surface; and wherein the optical fiber connector includes at least one thermal riveting post inserted in the at least one hole so as to fix the fixing plate to the insulating body.

12. The optical fiber connector according to claim 11, wherein the plurality of through holes are arranged in a row along a first direction;

wherein the at least one hole includes a first hole and a second hole; the first hole and the second hole are located on two sides of the plurality of through holes along a second direction; the second direction is perpendicular to the first direction; and wherein the at least one thermal riveting post includes a first thermal riveting post received in the first hole and a thermal riveting post received in the second hole.

13. The optical fiber connector according to claim 12, wherein the first hole and the second hole are disposed in a staggered manner along the second direction.

14. The optical fiber connector according to claim 10, wherein each through hole comprises a trumpet hole, the trumpet hole includes a first orifice and a second orifice opposite to the first orifice; and wherein the second orifice extends through the mounting surface, and a size of the second orifice is larger than a size of the first orifice.

15. The optical fiber connector according to claim 10, wherein the insulating body is injection-molded on two sides of the fixing plate, so as to fix the fixing plate to the insulating body.

16. The optical fiber connector according to claim 10, wherein the guiding and positioning pin protrudes beyond the mating surface.

17. The optical fiber connector according to claim 16, wherein the fixing shell defines a receiving space, the optical fiber connector further includes an installation block received in the receiving space and fixed to the fixing shell, the installation block defines a slot through which the plurality of optical fibers pass.

18. An optical fiber connector, comprising:

an insulating body including a first end surface, a second end surface opposite to the first end surface, a plurality of receiving holes extending through the first end surface, and a receiving chamber extending through the second end surface;

a plurality of optical fibers assembled to the insulating body, each optical fiber including a first extension portion protruding beyond the first end surface;

a ceramic fixing plate fixed to the insulating body, the fixing plate and the insulating body being made of different materials, the fixing plate including a mating surface, a mounting surface opposite to the mating surface, and a plurality of through holes extending through the mounting surface and the mating surface; the plurality of through holes and the plurality of receiving holes being aligned with each other; the first extension portion being inserted into a corresponding receiving hole and a corresponding through hole; the first extension portion being exposed on the mating surface;

a fixing shell defining a receiving space;

an installation block comprising a first fixing portion inserted in the receiving chamber of the insulating body, a second fixing portion received in the receiving space, and a slot through which the plurality of optical fibers pass; and a pair of guiding and positioning pins passing through the insulating body and the fixing plate, and protruding beyond the mating surface; the pair of guiding and positioning pins are in lock with the fixing shell so as to fix the fixing shell to the insulating body.

19. The optical fiber connector according to claim 18, wherein each through hole comprises a trumpet hole, the trumpet hole includes a first orifice and a second orifice opposite to the first orifice; and wherein the second orifice extends through the mounting surface, and a size of the second orifice is larger than a size of the first orifice.

20. The optical fiber connector according to claim 18, wherein the fixing plate defines at least one hole extending through the mounting surface and the mating surface; and wherein the optical fiber connector comprises at least one thermal riveting post inserted in the at least one hole so as to fix the fixing plate to the insulating body.

* * * * *